UNITED STATES PATENT OFFICE.

LOUIS LINDFORS AND CONRAD SCHULTZ, OF BOSTON, MASSACHUSETTS.

IMPROVEMENT IN STIFFENED OR SIZED HAT-BODIES.

Specification forming part of Letters Patent No. 194,606, dated August 28, 1877; application filed March 10, 1877.

*To all whom it may concern:*

Be it known that we, LOUIS LINDFORS, a subject of the king of Sweden, now residing in Boston, in the county of Suffolk and Commonwealth of Massachusetts, and CONRAD SCHULTZ, of said Boston, have invented a new and useful Improvement in Hat-Bodies, which is fully described in the following specification:

This invention consists in a hat-body sized or stiffened with a composition formed by mixing isinglass with shellac in solution.

To prepare this compound we mix half a pound of spirits of ammonia, four ounces of isinglass, and five pounds of shellac with nine quarts of boiling water, and keep the compound boiling fifteen minutes after the isinglass and shellac are dissolved.

Hitherto the gum used for the hat-bodies used in silk hats has been composed of shellac and spirits of ammonia, and it has been a great desideratum to decrease its weight. This we have attained by the addition of isinglass, as above described, and on this account, as well as because it keeps the hat-bodies in shape longer and renders them more elastic than has the gum hitherto used. It is peculiarly useful for silk hats, and will serve a useful purpose in felt hats.

We have found the above-mentioned proportions to be the best for ordinary use, but they may be varied as experience shall dictate.

We have hitherto used the Russian isinglass.

We claim—

A hat-body treated with the above-described gum, composed of spirits of ammonia, shellac, isinglass, and water, as and for the purposes above described.

LOUIS LINDFORS.
CONRAD SCHULTZ.

Witnesses:
FREDERICK P. FISH,.
WILLIAM Z. PERKINS.